March 9, 1965  F. HARTWIG ETAL  3,172,441
MIXING AND COMMINUTING DEVICE FOR FOODS
Filed Feb. 16, 1962  2 Sheets-Sheet 1

Fritz Hartwig
Lothar Kiesow
Inventors
By: George K Spencer
Attorney

Fritz Hartwig
Lothar Kiesow
Inventors

United States Patent Office 3,172,441
Patented Mar. 9, 1965

3,172,441
MIXING AND COMMINUTING DEVICE
FOR FOODS
Fritz Hartwig and Lothar Kiesow, Oldenburg, Germany,
assignors to Licentia Patent - Verwaltungs - G.m.b.H.,
Frankfurt am Main, Germany
Filed Feb. 16, 1962, Ser. No. 173,735
Claims priority, application Germany, Feb. 17, 1961,
L 38,222
10 Claims. (Cl. 146—68)

The present invention relates generally to mixing and comminuting devices for the mixing and/or comminution of foods, and, more particularly, to an advantageous design and construction of a mixing container, including the knives associated therewith and the connecting sleeve for attaching the container and knife assembly to the motor drive unit. The present invention especially concerns the type used as an attachment for kitchen-type machines or as an independent utensil having its own motor drive unit.

The conventional types of mixing containers are upwardly flared and have a lower cylindrical projection or sleeve which is used for screwing them into their connection sleeves. A bottom portion which carries the shaft having a set of knives thereon, is inserted into this connection sleeve. Also, mixing containers are known which are cylindrical in shape as well as those having an upwardly tapering shape.

The object of mixer-comminutors is not only to provide for good mixing of liquids, but also to provide for comminution of solid materials, such as vegetables, fruit, dried bread, and the like, without the addition of liquids. In order to accomplish this there must be uniform circulation of the material in the mixing container. The achievement of such uniform circulation depends not only upon the speed and shape and construction of the cutting means, but is essentially determined by the shape of the mixing container and by the interrelationship of various factors and elements such as the speed, the set of knives, and the mixing vessel. Small variations in the cutting means or in the position thereof, and small variations in the shape of the mixing container have a great effect. It is difficult to provide equally good circulation for all types of solid material. Also, other factors to be considered are ease of operation, ease of cleaning, safety from accidents, as well as the complexity of the device and the amount of parts and materials to be used therein and thus to be cost of production.

A main object of this invention is to provide a mixing container and cutting means for a mixer-comminutor wherein proper circulation of all types of solid material to be treated therein, is assured.

Another object is to provide a mixing container which is simple to clean.

Another object is to provide a separable mixing container wherein the lower portion thereof may be produced inexpensively.

A further object is to provide a mixer-comminutor arrangement wherein the knives thereof are comparatively simple in construction.

These objects and others ancillary thereto are accomplished according to preferred embodiments of the invention wherein the mixing container tapers upwardly, is open at the top, and is so shaped that the largest internal diameter of the mixing container is disposed directly above the vertical zone through which the knives forming the cutting means extend with the diameter of the container above and below this point being progressively smaller. It has been found that particularly favorable results are obtained if: (1) the portion of the container above that having the greatest internal diameter is provided with substantially the shape of a truncated cone; (2) has an angle of inclination larger than that whose tangent equals 0.18, and (3) that the largest diameter of the set of knives is 9/10 the largest internal diameter of the mixing container. The knives may then be relatively simple in construction.

Also, the mixing container is divided into two separable parts, an upper and a lower portion, and the line of division therebetween is substantially in the vicinity of the greatest internal diameter of the container. This, of course, provides for ease of cleaning. Also, a connecting sleeve is provided for attaching the container to the motor unit. Clamps are provided which not only maintain the upper and lower portions of the container together, but also maintain the container on the connection sleeve. The lower container portion defines the bottom of the container and may be fixed to the connection sleeve so that an integral unit is formed.

Additional objects and advantages of the present invention will become apparent upon consideration of the following description when taken in conjunction with the accompanying drawings in which.

Figure 1:
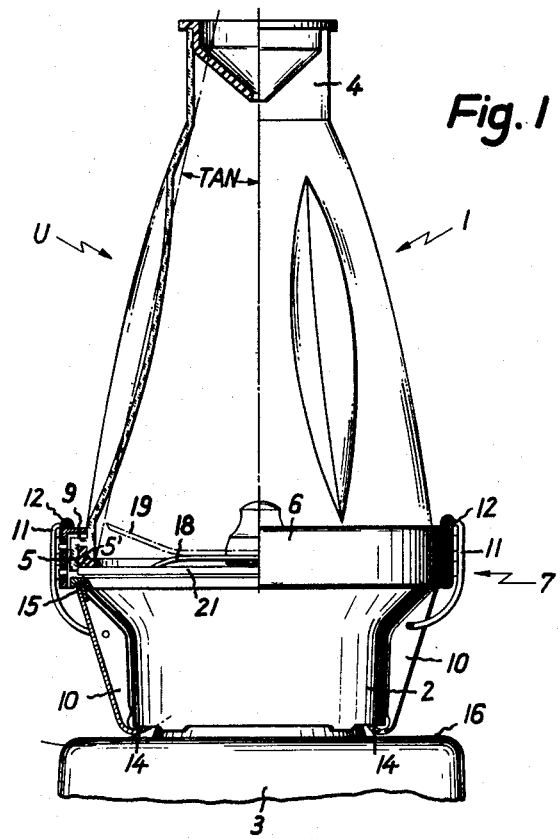
FIGURE 1 is a side view of the mixer-comminutor of the present invention, partially in section.
Figure 2:
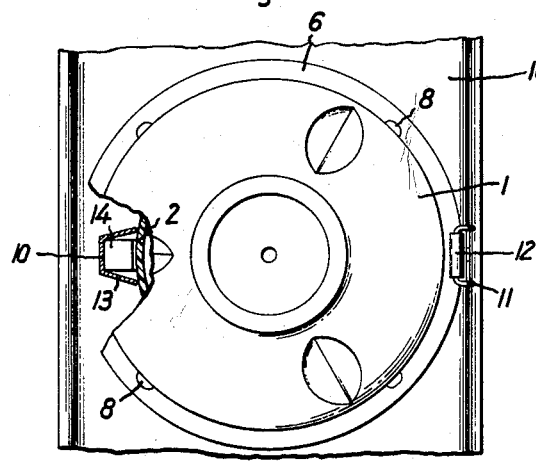
FIGURE 2 is a plan view of the device of FIGURE 1 partially in section.

With more particular reference to the drawings, FIGURE 1 illustrates a portion of the motor drive unit 3 having a connection sleeve unit 2 which is detachably arranged thereon for mounting the mixing container 1, on the motor drive unit 3. The mixing container 1 is constructed of two portions, an upper portion U, illustrated in FIGURE 1, and a lower portion L, illustrated in FIG. URE 3. These portions are secured together in a manner which will be explained in further detail below, it being noted that such a construction provides advantages in the manufacture of the container and is also very convenient for emptying and cleaning the container. The container 1 is generally in the shape of a frustum and the upper portion U has its walls tapered upwardly with the inclination thereof having an angle which is such that the tangent thereof is larger than 0.18.

The upper portion U of container 1 is provided with a cylindrical projection 4 in order to render the container more manageable. The lower edge of the upper portion U of the container is provided with an annular groove 5 which faces downwardly and is provided with a rubber gasket 5' which is L-shaped in cross section, and by means of which the upper portion U of container 1 is sealingly mounted on the lower portion as will be further explained below. It should be noted that the division of the upper and lower portions of the container is disposed substantially at or near the location of the greatest internal diameter of the container.

The upper portion U of the container 1 is clamped to the lower portion and to the connection sleeve 2 by means of independent clamps 7 which are fastened to a collar 6 having lugs 8 which rest upon an annular ledge 9 of the mixing container, this ledge being formed because of the structure which defines the annular groove 5.

Figure 3:
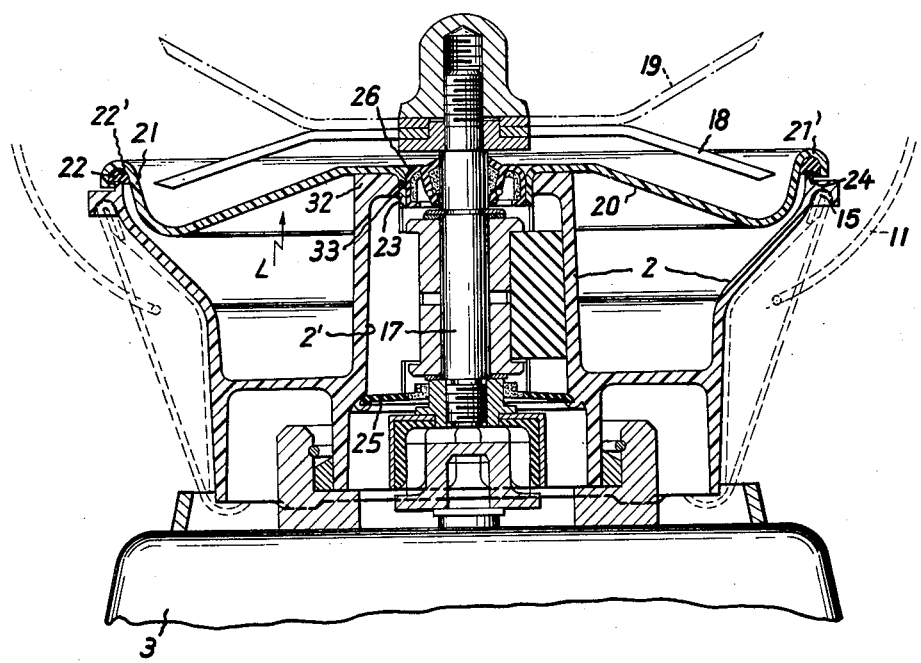
FIGURE 3 is a vertical sectional view, on an enlarged scale, taken through the connection sleeve and illustrating the lower portion of the mixing container and the cutting means.

With more particular reference to FIGURE 3, the connection sleeve 2 is provided with an upper and outer ring-like flange 24 at the edge of the connection sleeve 2. The center of connection sleeve 2 is hollow and defines a chamber 2' having an upper end closure 32 with a circular opening 33 formed therein. A shaft 17 for moving the cutting means, i.e., the set of knives, is rotatably mounted in chamber 2' by means of bearings or the like. A gasket 25 is provided at the lower end of the knife shaft 17 to thus seal this portion of the connection sleeve from the outside. The outer edge of the connection sleeve 2 is provided with a downwardly open annular groove 15 which is adjacent the ring-like flange 24, which aids in the use of clamps 7 in a manner which will be further explained below.

The lower container portion L has a bottom 20 which is inclined downwardly and is generally in the shape of a flattened frustum. The outer end 21 is curved upwardly and provided with a flange 21' which defines a downwardly open annular groove 22' in which a gasket 22 is provided. This lower portion of the mixing container has a downwardly extending cylindrical projection 23 which is inserted into opening 33 of the connection sleeve 2, and the gasket 22 sits upon the ring-like flange 24 at the outer edge of the sleeve 2 and a seal is formed at this gasket. The remainder of the sealing of chamber 2' of the connection sleeve 2 is provided in order to seal this chamber from the interior of the container and this is achieved by means of packing 26 which is inserted in the cylindrical projection 23.

Thus, the lower portion L of the mixing container provides, at its outer flanged portion 21', the downwardly open annular groove 22' for the gasket 22 for the sealing connection with the connection sleeve, and at the same time, provides, by means of its upper surface, a good convex annular support for the upper container portion. The cylindrical projection 23 is pressed onto the connection sleeve and, at the same time, acts as carrier for packing ring 26 for the knife shaft 17 which is supported in the connection sleeve 2. Thus, this bottom portion of the mixing container may advantageously be produced as a stamped and pressed part. The lower portion of the vessel more or less defines the bottom of the mixing container which may be integrally connected with the connection sleeve.

A cutting means is provided by a set of knives which includes two similar straight flat knives disposed one above the other and substantially at right angles to each other, these knives 18 and 19 being mounted on knife shaft 17 which is supported in connection sleeve 2. At substantially one half the radius of the knives, the cutting ends proper of the lower knife 18 are bent at an angle of substantially 10° below the horizontal, whereas those of the upper knife 19 are bent at substantially an angle of 30° above the horizontal. The bent portions of the lower knife are substantially parallel to the bottom 20 of the lower portion L of the mixing container.

The upper and lower portions of the container are retained in place neither by screw caps nor by clamps which are fastened to one of the two parts, but are rather held together by two clamps which are fastened to a loose collar 6, which is engaged over the ledge 9 at the lower end of the upper portion U of the mixing container on which it rests. These clamps include clamp levers 10 which are inserted between the legs of clamp brackets 11, which are, in turn, inserted in eyes 12 of the collar 6. These clamp levers 10 are trapezoidal in section and are provided with outwardly inclined legs 13 and bent lower ends 14. The legs of these levers are constructed so that when the clamp is tensioned and in place, they substantially abut against the profile of the connection sleeve 2 and the lower bent portions 14 engage the lower surface of the connection sleeve 2. The other or upper ends of the clamping levers 10 are inserted into the downwardly facing annular groove 15 before the tensioning of the clamp. When the mixer-comminutor is mounted on the motor drive unit 3, the clamp levers 10 cannot be disengaged for, in attempting to do this, the lower ends 14 of the clamp levers push against the upper surface 16 of the housing or against a motor unit flange which may be provided for the purpose. Also, the closed shape of the clamp levers 10 do not offer any real surface of attack.

These clamps are thus so constructed that, when they are in place, the edge of the connection sleeve or the gasket inserted in the annular groove is firmly pressed against the flange portion of the lower portion L of the mixing container. The plurality of lugs 8 are equiangularly spaced on the ring 6 in order to provide for uniform distribution of pressure. The clamp levers 10 are so long that when the clamp is tensioned, the bent ends 14 of the levers engage below the bottom edge of the connection sleeve. Thus, with the edge sufficiently low with respect to the motor housing and with the mixer-comminutor mounted on its drive unit, the clamp cannot be disengaged because in disengaging, the bent ends 14 of the clamping levers 10 press against the housing of the drive unit. Even with a greater distance between the connection sleeve 2 and the housing wall of the motor unit, this feature can always be achieved safely by providing a ring-like flange on the housing. The safety is even further increased if the clamping levers are constructed to have a trapezoidal or U-shaped cross section and the legs of this section are constructed such that when the clamp is tensioned, they abut against the outer surface of the connection sleeve.

It should be noted that mixing containers of the type according to the present invention need not have perfectly conical walls, but they may be only generally conical. In such an event, the above-mentioned inclination of the container walls is with respect to the general inclination when the walls in section appear curved, for example, instead of straight.

It will be understood that the above description of the present invention is susceptible to various modifications, changes, and adaptations, and the same are intended to be comprehended within the meaning and range of equivalents of the appended claims.

What is claimed is:

1. In a mixer-comminutor having a motor drive unit, the combination which comprises: an upwardly tapering mixing container which is open at the top; rotatable cutting means arranged in said container and extending through a predetermined vertical zone, the maximum internal diameter of said mixing container being disposed directly above said vertical zone occupied by said cutting means; said mixing container having, above the largest internal diameter thereof, the shape of a truncated cone having such an angle of inclination that its tangent is larger than 0.18; the diameter of the circular area in the plane through which said cutting means move corresponding to about nine-tenths of the amount of said largest internal diameter of said container; said mixing container being divided into an upper portion and a generally cup-shaped lower portion at a position substantially at the largest internal diameter of said container; and clamp means for retaining said container portions together.

2. The combination defined in claim 1 wherein said container has a cylindrical projection at the upper end thereof.

3. In a mixer-comminutor having a motor drive unit, the combination which comprises: an upwardly tapering mixing container which is open at the top; rotatable cutting means arranged in said container and extending through a predetermined vertical zone, said cutting means comprising a set of knives including two similar straight flat knives disposed at right angles to one another and having end portions which are bent at a distance of one half the radius thereof, the end portions of the lower knife being bent at an angle of approximately 10° downwardly of the horizontal and the end portions of the upper knife being bent upwardly at an angle of approximately 30° with respect to the horizontal, the maximum internal diameter of said mixing container being disposed directly above said vertical zone occupied by said cutting means; said mixing container having, above the largest internal diameter thereof, the shape of a truncated cone having such an angle of inclination that its tangent is larger than 0.18; the diameter of the circular area in the plane through which said cutting means move corresponding to about nine-tenths of the amount of said largest internal diameter of said container; said mixing container being divided into an upper and a lower portion at a position substantially at the largest internal diameter of said container; and means for retaining said container portions together.

4. The combination defined in claim 3 wherein said lower container portion is constructed of sheet metal and is formed in a stamping and pressing operation; the bottom of said lower container portion forming a flattened truncated cone whose conicity corresponds to the angle formed by the end portions of said lower knife; said bottom being provided with a downwardly disposed cylindrical projection in its center which is seated on a mounting socket by which said container is connected to the drive unit; the outer edge of said lower container portion defining a downwardly opening groove; and a gasket disposed in said groove and abutting against an outer ring-like flange which is part of said socket.

5. The combination defined in claim 4 wherein said upper container portion is provided with a flange having a downwardly opening ring, there being a further gasket disposed in said last-mentioned groove and abutting said lower container portion.

6. The combination defined in claim 5 wherein said retaining means comprise a collar surrounding the outer edges of said upper and lower container portions, said collar having lugs abutting said flange of said upper container portion, said clamping means further comprising clamping levers connected to said collar.

7. The combination defined in claim 6 wherein said socket is provided with an outer edge portion having a downwardly opening groove for receiving one end of said clamping levers.

8. The combination defined in claim 7 wherein said drive unit has a ring-like flange positioned so that when said container is placed on said socket, said clamping levers are prevented from having their lower ends removed due to engagement of said levers against said last-mentioned flange.

9. The combination defined in claim 8 wherein said clamping levers have a configuration which mates with that of said socket.

10. The combination defined in claim 9 wherein said configuration is trapezoidal.

References Cited in the file of this patent

UNITED STATES PATENTS

| | | |
|---|---|---|
| 2,028,595 | Flegel | Jan. 21, 1936 |
| 2,733,396 | Luther | Jan. 31, 1956 |
| 2,757,909 | Wayne | Aug. 7, 1956 |
| 2,771,111 | Seyfried | Nov. 20, 1956 |
| 2,820,595 | Schumacher | Jan. 21, 1958 |
| 2,954,174 | Polleys | Sept. 27, 1960 |